US008515588B2

(12) United States Patent
Warner

(10) Patent No.: US 8,515,588 B2
(45) Date of Patent: Aug. 20, 2013

(54) GENERATOR RESERVE CAPACITY CONTROL SYSTEM AND NETWORK

(75) Inventor: David Arthur Warner, Fort Collins, CO (US)

(73) Assignee: General Electric Company, Schenectady, NY (US)

(*) Notice: Subject to any disclaimer, the term of this patent is extended or adjusted under 35 U.S.C. 154(b) by 240 days.

(21) Appl. No.: 13/043,914

(22) Filed: Mar. 9, 2011

(65) Prior Publication Data
US 2012/0232710 A1 Sep. 13, 2012

(51) Int. Cl.
G05D 3/12 (2006.01)
G05D 5/00 (2006.01)
G05D 9/00 (2006.01)
G05D 11/00 (2006.01)
G05D 17/00 (2006.01)

(52) U.S. Cl.
USPC ........... 700/287; 700/286; 700/291; 700/295; 700/297; 323/204; 323/304; 323/318

(58) Field of Classification Search
USPC ......... 700/286, 287, 291, 295–297; 323/204, 323/304, 318
See application file for complete search history.

(56) References Cited

U.S. PATENT DOCUMENTS

| | | | | |
|---|---|---|---|---|
| 5,706,207 A * | 1/1998 | Kurten et al. | | 700/286 |
| 6,571,152 B1 * | 5/2003 | Sawa et al. | | 700/286 |
| 6,639,331 B2 * | 10/2003 | Schultz | | 307/84 |
| 6,775,594 B1 | 8/2004 | Conigliaro et al. | | |
| 6,802,221 B2 | 10/2004 | Hedeen et al. | | |
| 7,062,389 B2 | 6/2006 | Johnson et al. | | |
| 7,127,327 B1 | 10/2006 | O'Donnell et al. | | |
| 7,142,949 B2 | 11/2006 | Brewster et al. | | |
| 7,315,769 B2 * | 1/2008 | Balan et al. | | 700/286 |
| 7,333,880 B2 | 2/2008 | Brewster et al. | | |
| 7,369,968 B2 | 5/2008 | Johnson et al. | | |
| 7,372,173 B2 * | 5/2008 | Lutze et al. | | 290/44 |
| 7,698,233 B1 | 4/2010 | Edwards et al. | | |
| 7,756,678 B2 | 7/2010 | Bonissone et al. | | |
| 7,822,578 B2 | 10/2010 | Kasztenny et al. | | |
| 7,834,479 B2 * | 11/2010 | Capp et al. | | 307/21 |
| 7,949,435 B2 * | 5/2011 | Pollack et al. | | 700/291 |
| 8,046,110 B2 * | 10/2011 | Mayor et al. | | 700/297 |

(Continued)

FOREIGN PATENT DOCUMENTS

| | | |
|---|---|---|
| DE | 43 15 317 A1 | 11/1994 |
| JP | 2010-183760 | 8/2010 |
| JP | 2010-183760 A | 8/2010 |

OTHER PUBLICATIONS

EP Search Report, Aug. 31, 2012.

(Continued)

Primary Examiner — Ramesh Patel
(74) Attorney, Agent, or Firm — Dority & Manning, P.A.

(57) ABSTRACT

The present subject matter relates to methods, systems, and networks for making available identified generator reserve capacity to provided compensation for lost generator capacity on a temporary basis. The present subject matter provides for increasing the power output of currently operating synchronous generators to provide substantially instantaneous supply of additional power upon loss of other generating capability. The system takes into consideration and makes available to system operators the general availability of additional real power output capability of operating generators even though such power generation may be provided at less than optimal operating characteristics of the individual generators providing the additional power.

12 Claims, 4 Drawing Sheets

(56) References Cited

U.S. PATENT DOCUMENTS

| | | | |
|---|---|---|---|
| 8,219,259 B2* | 7/2012 | Haugh | 700/295 |
| 8,260,468 B2* | 9/2012 | Ippolito et al. | 700/286 |
| 8,340,832 B1* | 12/2012 | Nacke et al. | 700/295 |
| 2005/0034023 A1* | 2/2005 | Maturana et al. | 714/37 |
| 2008/0243687 A1* | 10/2008 | Johnson et al. | 705/40 |
| 2009/0055030 A1* | 2/2009 | Mayor et al. | 700/287 |
| 2010/0023337 A1* | 1/2010 | Case | 705/1 |

OTHER PUBLICATIONS

Search Report issued in connection with EP Application No. 12158305.8, Aug. 31, 2012.

* cited by examiner

GENERATOR RESERVE CAPACITY CONTROL SYSTEM AND NETWORK

FIELD OF THE INVENTION

The present subject matter relates to power generation. More particularly, the present subject matter relates to methodologies for replacement of lost generator capacity.

BACKGROUND OF THE INVENTION

It is common practice to require utilities and dispatch centers to maintain a capability of replacing the generating capacity of certain renewable energy generation on temporary loss of the renewable resource. Traditional power dispatch solutions exist for replacing lost generation, but in some instances these replacement solutions involve adding additional stand-by assets at considerable cost of hardware.

Operational situations certainly vary, but often there is a considerable time delay in the identification of a decrease in generation supply and the resulting delivery of the required replacement quantity of power. It would be advantageous, therefore, to provide a generation loss replacement system that can offer instant command and control system reaction. It would be further advantageous to provide a system that will identify, quantify and economically deliver desired reserve capacity from existing operating synchronous generating equipment when needed to meet power commitments in preference to activating stand-by generating capacity.

BRIEF DESCRIPTION OF THE INVENTION

Aspects and advantages of the invention will be set forth in part in the following description, or may be obvious from the description, or may be learned through practice of the invention.

The present subject matter relates to methods for replacing lost generator capacity. In accordance with one method, operational characteristics of one or more energy generators are evaluated to determine reserve generation capacity of the generators. Offers of access to identified reserve energy capacity may be generated, and if such offer is accepted, the local generator control system is enabled to cause the generator to increase its real power output.

In selected methods according to present disclosure, the operational characteristics of a plurality of energy generators are evaluated to determine their individual reserve capacity and an offer of access to up to the combined reserve of the plurality of energy generators may be generated.

In certain of the methods, offer acceptance commands may be made directly to a local generator from an offer accepting entity. In certain methods, offering access to reserve capacity may correspond to offering access to operating synchronous generating equipment that, in some cases may correspond to offering access to one or more operating turbine driven generators.

In particular embodiments of the method, differentially measurement of energy produced above a predetermined value following acceptance of an offer is provided to determine the amount of power delivered from the generator. In selected of these methods, the predetermined value is established to be the operating baseline for the generator prior to increasing generator output in response to an accepted offer.

In selected other embodiments of the method, reserve generation capacity is determined based at least in part on temporary generation operation beyond optimal operation points.

The present subject matter also relates to a system for replacing lost generator capacity. In accordance with certain such systems, at least one energy generator that has reserve energy generation capacity is provided. The system also includes a signaling system configured to communicate an offer of access to the reserve energy generation capacity and a local generator control system is provided and configured to receive an offer acceptance signal and to cause the generator to increase its real power output upon acceptance of a communicated offer.

In selected embodiments, a system is provided including a plurality of operating synchronous generators each with their own individually determined reserve capacity. In such systems, a signaling system is provided that is configured to offer access to up to the combined reserve capacity of the plurality of energy generators.

In selected systems, a differential metering device is provided and configured to measure energy produced by the at least one energy generator above a predetermined value following acceptance of an offer of access so that the actual amount of power delivered from the generator may be determined. In selected systems, the differential metering device is configured to measure delivered generator output power above an operating baseline for the generator prior to increasing the generator output power in response to an accepted offer.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
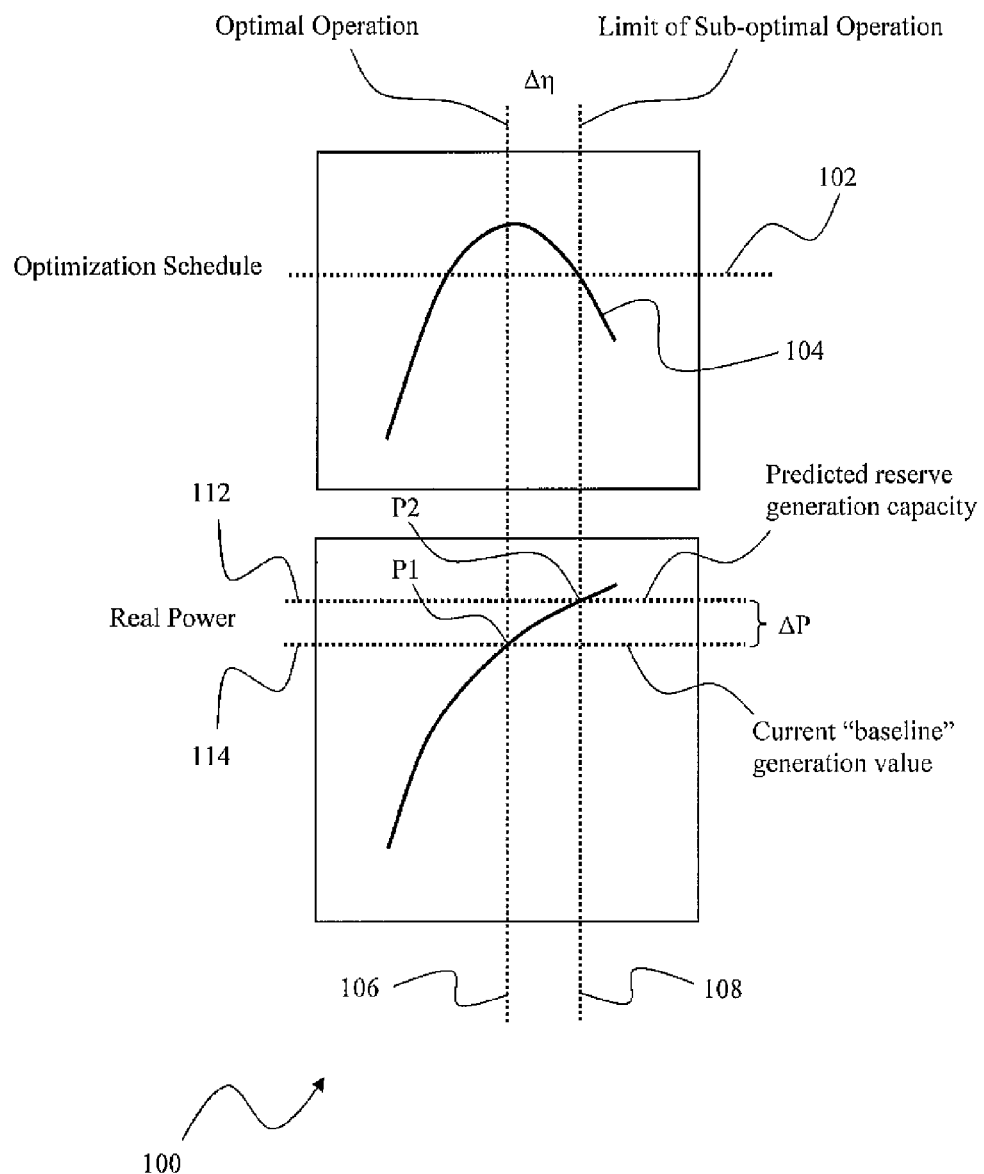
FIG. 1 is a graphical illustration of operational capabilities of an exemplary generator and illustrates predicted reserve generating capacity.

Repeat use of reference characters throughout the present specification and appended drawings is intended to represent same or analogous features or elements of the invention.

DETAILED DESCRIPTION OF THE INVENTION

Reference will now be made in detail to the presently preferred embodiments of the subject generator reserve capacity control system and networks, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 graphically illustrates operational parameters for an exemplary generator. The illustrated graphs 100 show a number of operational aspects including predicted reserve generating capacity $\Delta P$ as may be made available in accordance with present technology.

Generating assets that are well run will operate the majority of the time at an optimum control point. More often than not, however, there is extra generating capacity available on a currently generating machine, although that additional capacity may not be optimal, due to any variety of local parameters. For example, as illustrated in FIG. 1, a generating device may be operated at any number of points along an optimization schedule 102 and will operate with varying efficiencies as generally illustrated by operation line 104 as such line 104 passes between a recognized optimal operation line 106 and a limit line 108 generally recognized as a line of sub-optimal operation below which the generator generally should not be operated.

In accordance with present technology, a control system and revenue metering protocol is provided where a generating asset can allocate an incremental generation reserve that can be quantified, totaled with other assets, and offered to the system dispatcher as an incremental generating capability that can be acted upon at a single command.

For example, as further illustrated in FIG. 1, by combining knowledge of generator performance characteristics and evaluation of resource scheduling and outlook, those individuals responsible for generator operations may develop an acceptable increment of power "$\Delta P$" that may be obtained beyond the current optimal unit equilibrium. In this manner, a generator operating, for example, at or near optimal operating point P1 at the junction point of optimal operation line 106 and the current or baseline generation value 114, may, nevertheless be called upon to provide additional real power up to a predicted reserve generation capacity value 112.

In so doing, it is appreciated that the operation of the generator at operational point P2 will provide an increase in real power but such operation will be sub-optimal. Under such conditions, however, an operating generator may be able to supply increased capacity quicker than a time necessary to bring additional reserve capability online, thereby providing an acceptable temporary alternative. Upon determination that a generator may be able to provide additional capacity, the control system may then assign an available quantity of real power, which may then be offered to the power dispatch authority as an increment of reserve capacity "$\Delta P$."

Figure 2:
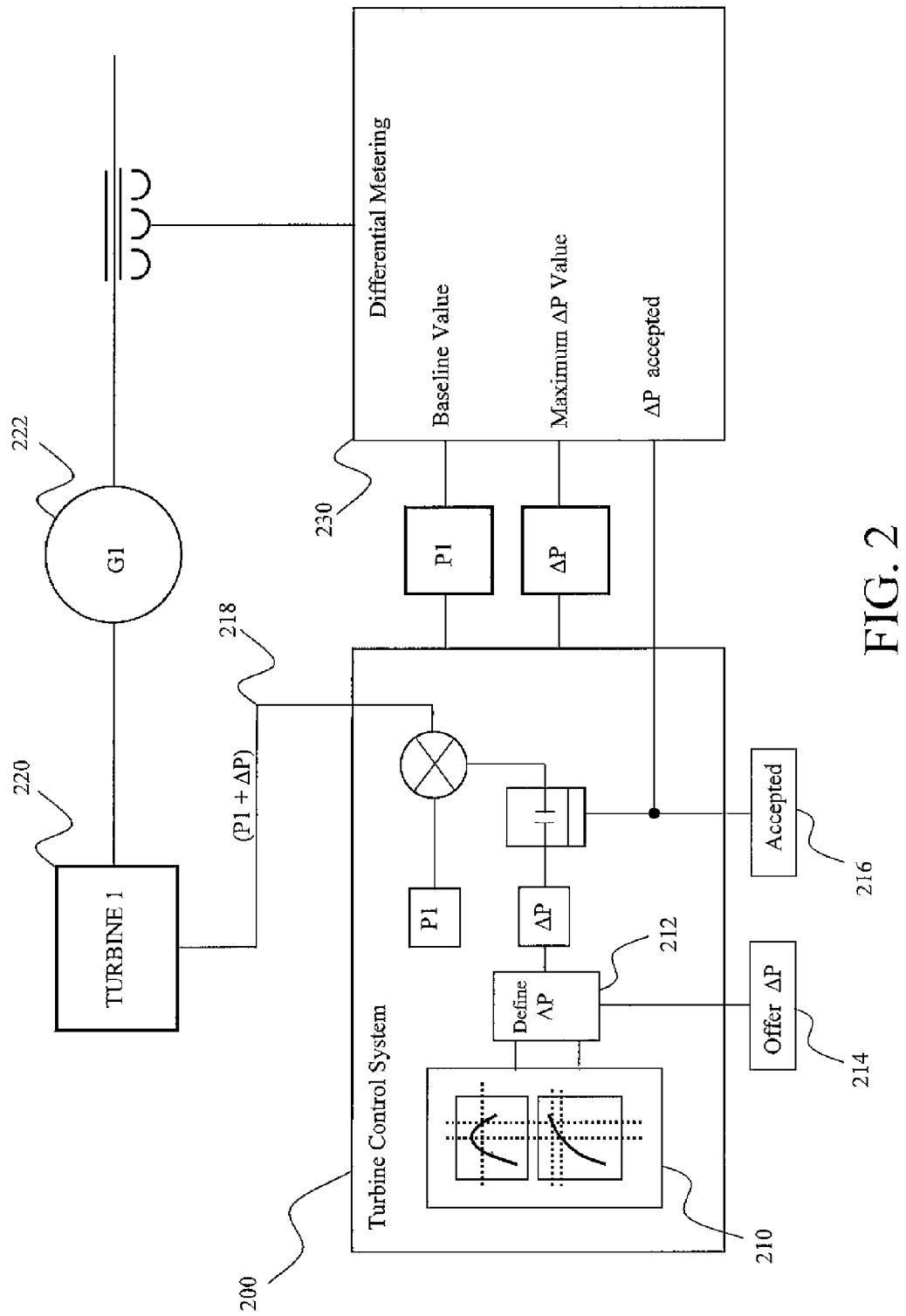
FIG. 2 is a block diagram of a turbine generator and control system in accordance with present technology.

With reference to FIG. 2, and in accordance with present technology, turbine control system 200 is configured to identify a number of parameters 210 based on the parameters previously illustrated in FIG. 1 including a baseline generation value 114, that is, the actual generator output at the time the reserve quantity is "offered." The turbine control system 200 may then be configured to define a reserve quantity 212 of additional real power $\Delta P$ that may be offered to the power dispatcher. The offer may also include a time stamped event record of the availability of the reserve quantity.

Indications 214 of such an offer may be made to the power dispatcher and, if accepted, an indication of acceptance 216 may be sent to the turbine control system 200 where after the turbine control system 200 would then respond by adding the offered real power $\Delta P$ value to the baseline value P1 and providing the sum, P1+$\Delta P$, as a control signal on line 218 to turbine 220.

At the same time, and further in accordance with additional aspects of the present subject matter, a differential metering device 230 is provided information regarding the baseline generation value P1, the maximum real power $\Delta P$ value being offered and an indication of acceptance of the offer by the power dispatcher. Differential metering device 230 may then monitor the output of generator 222 to record the actual amount of energy being provided over and above the original baseline value P1 so that the option of premium billing for the incremental increase in provided power may be made available to the generator operator.

Figure 3:
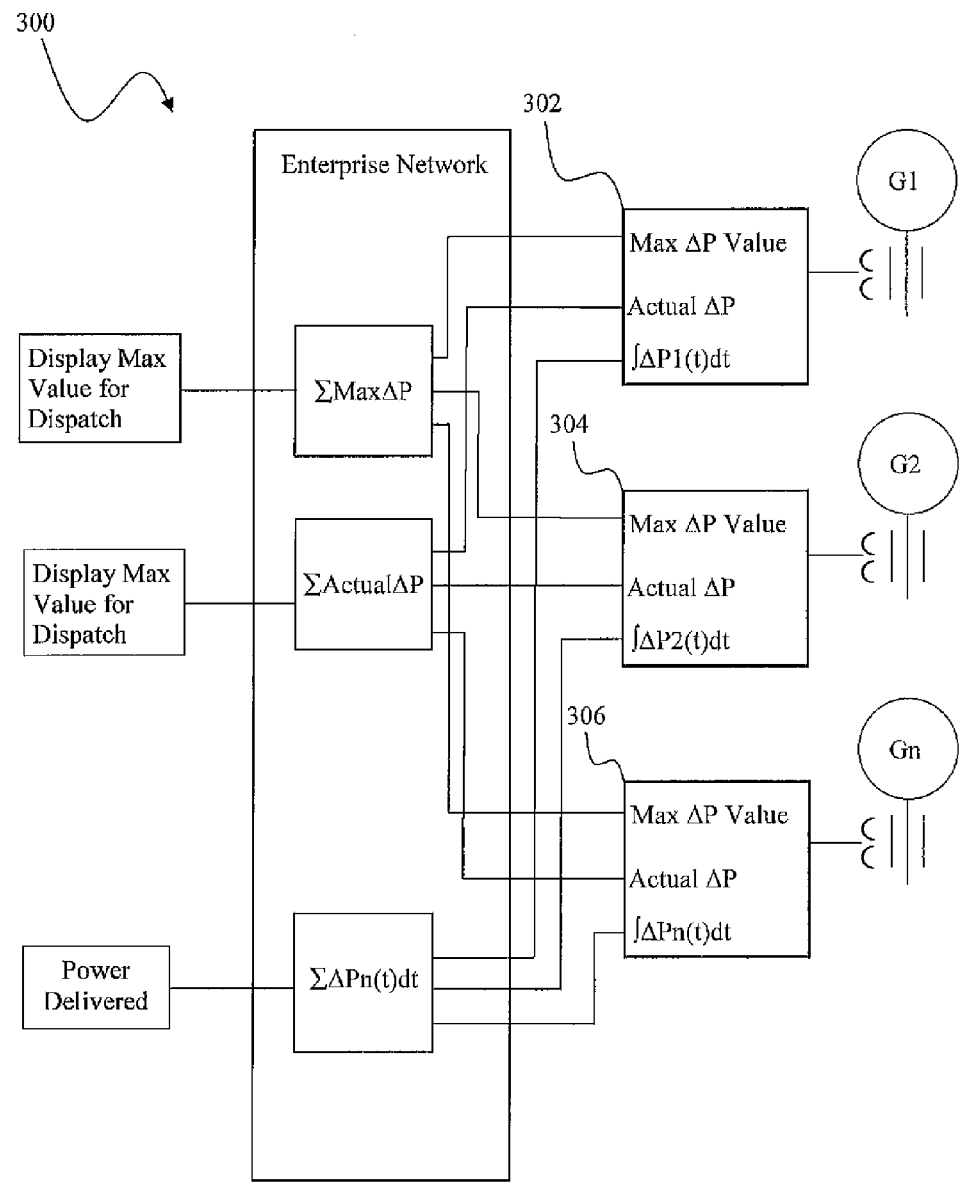
FIG. 3 is a block diagram illustrating an enterprise network incorporating plural generators in accordance with further aspects of the present subject matter.

Those of ordinary skill in the art will appreciate that a similar analysis may be performed for any and all individual generating units being considered to provide reserve capacity and that each such generating unit may have different capacities identified. Thus as illustrated in FIG. 3, multiple generator units G1, G2, Gn, each having been evaluated as described in relation to FIG. 1, can be combined in an Enterprise Reserve Network 300 where a summation of evaluated quantities may be presented to the dispatch authority. It should be appreciated that each of the generator units G1, G2, Gn, illustrated in FIG. 3 are provided with their own control systems like that illustrated in FIG. 2 but omitted from FIG. 3 for simplicity of illustration.

Such an enterprise reserve network 300 may be configured to manage and monitor individual generator maximum real power incremental increase $\Delta P$ values and to offer such incremental increases in real power to power dispatchers. Upon receipt of an acceptance signal, individual generator control systems may be alerted for immediate action and response. This acceptance signal is an additive and scaled quantity suitable for immediate action by the local control system associated with each individual generator. It should be understood that the local control systems are configured to receive and act on this acceptance as part of the decision making that creates the offer for an incremental real power increase.

In the present context, the control quantity "P1" represents the current baseline power setting and in most cases corresponds to the point where the control system is in a droop or speed regulation mode. This is also the point where the control system could be responsive to frequency disturbances, allowing automatic reaction by the control system and most often resulting in an offset between the desired power and actual power during a period of frequency excursion.

As illustrated in FIG. 3, at each unit whose offer for reserve generation has been accepted, a differential revenue meter 302, 304, 306 similar to differential meter 230 illustrated in FIG. 2, acts in response to the acceptance command of the reserve quantity, time stamps the event of acceptance and with knowledge of the baseline generation level and the magnitude of the reserve quantity, begins to accumulate the actual quantity of reserve generation delivered. The differential meter may also report real time data directly to dispatch or to enterprise network 300 for summation of individual quantities that are reported to dispatch throughout the acceptance period.

The differential meters 302, 304, 306 have knowledge of the baseline value and the ΔP accepted, and will not integrate generation values that result in total generation above the sum of the baseline value plus ΔP. The differential meters 302, 304, 306 will also correctly observe and integrate delivered power less than the desired sum. These situations may occur as a result of frequency disturbance or simple unit "hunting".

Real time metered confirmation of the delivered reserve represents a significant aspect of the present subject matter. It should be appreciated that generator units participating in the delivery of reserve power are not enabling conflicting local operator commands. Rather the acceptance by dispatch of offers establishes a "surrender" of authority and injects a load command offset into the unit control system. In actual implementation, unit protection actions must be respected thus individual units may remain in frequency control mode, and will respond to system frequency disturbances by automatically responding with corrective actions. These actions will be captured and properly included in the integration of reserve power delivered during the acceptance period.

Figure 4:
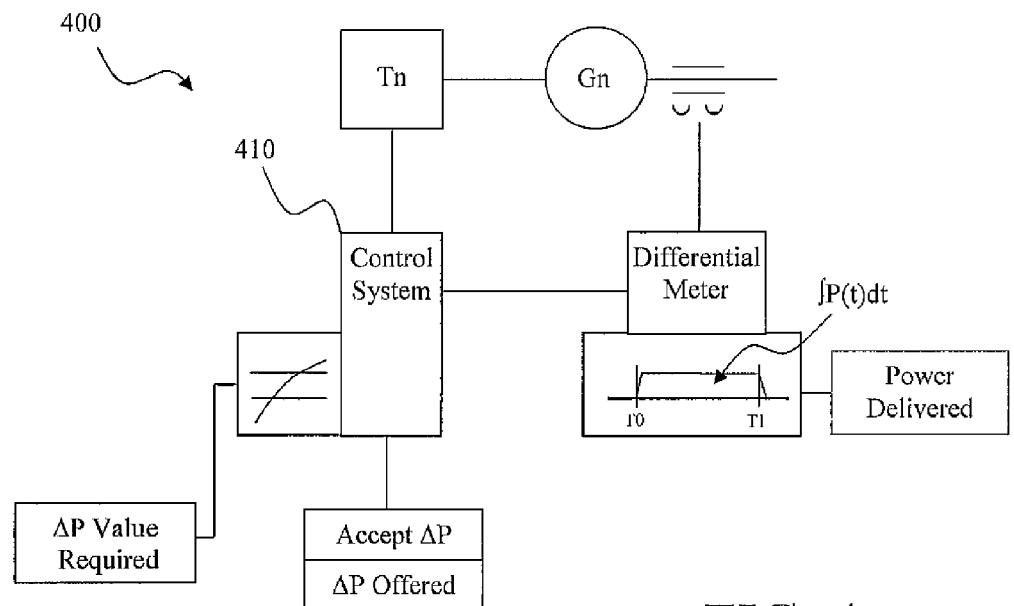
FIG. 4 is a block diagram illustrating operation of an exemplary turbine generator system when providing available reserve power generation.
Figure 5:
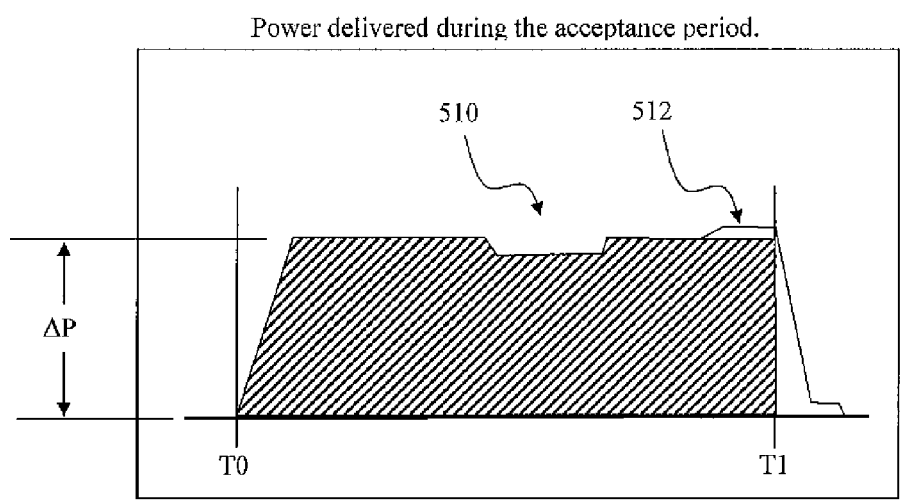
FIG. 5 is a graphical representation of power delivered during a period of acceptance of offered incremental increase in power generation.

With reference to FIGS. 4 and 5, during an exemplary operational time period of a local generator system 400, it will be noted that during the mid portion 510 of the time period T0 to T1, the control system 410 (FIG. 4) may have modified the unit output in response to an over-frequency situation, for example. The magnitude of desired ΔP has not changed, but the baseline power set point was scaled by the speed droop curve and the resulting promised reserve quantity is not being delivered.

The region at the end 512 of the acceptance period T0 to T1 shows the opposite situation. Here the control system has responded to a system under-frequency and the total power delivered exceeds the current value of ΔP. Here the differential meter correctly does not integrate the additional power during that time frame. Also note that after the acceptance period has ended, the under frequency situation remained for some time before the unit control system returned the baseline power to the originally scheduled setting.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for replacing lost generator capacity, comprising:
   evaluating operational characteristics of one or more energy generators to determine reserve generation capacity;
   generating offers of access to identified reserve energy capacity; and
   enabling a local generator control system to cause the generator to increase its real power output upon acceptance of an offer.

2. The method of claim 1, further comprising:
   evaluating operational characteristics of a plurality of energy generators to determine their individual reserve capacity; and
   generating offers of access to up to the combined reserve of the plurality of energy generators.

3. The method of claim 1, further comprising:
   accepting commands directly at a local generator from an offer accepting entity.

4. The method of claim 1, wherein generating offers of access comprises generating offers of access to reserve capacity from operating synchronous generating equipment.

5. The method of claim 1, wherein generating offers of access comprises generating offers of access to reserve capacity from one or more operating turbine driven generators.

6. The method of claim 1, further comprising:
   differentially measuring energy produced above a predetermined value following acceptance of an offer to determine the amount of power delivered from the generator.

7. The method of claim 6, further comprising:
   establishing the predetermined value to be the operating baseline for the generator prior to increasing generator output in response to an accepted offer.

8. The method of claim 1, wherein the reserve generation capacity is determined based at least in part on temporary generation operation beyond optimal operation points.

9. A system for replacing lost generator capacity, comprising:
   at least one energy generator, said generator having reserve energy generation capacity;
   a signaling system configured to communicate an offer of access to the reserve energy generation capacity; and
   a local generator control system configured to receive an offer acceptance signal and to cause said generator to increase its real power output upon acceptance of a communicated offer.

10. A system as in claim 9, further comprising:
    a plurality of operating synchronous generators each with their own individually determined reserve capacity; and
    a signaling system configured to offering access to up to the combined reserve capacity of the plurality of energy generators.

11. A system as in claim 9, further comprising:
    a differential metering device configured to measure energy produced by said at least one energy generator above a predetermined value following acceptance of an offer,
    whereby the actual amount of power delivered from the generator may be determined.

12. A system as in claim 11, wherein said differential metering device is configured to measure delivered generator output power above an operating baseline for the generator prior to increasing the generator output power in response to an accepted offer.

* * * * *